(12) United States Patent
Roberts

(10) Patent No.: US 6,758,574 B1
(45) Date of Patent: Jul. 6, 2004

(54) CONVERSIONS BETWEEN STANDARD COLOR SPACES

(75) Inventor: Peter Malcolm Roberts, Birchgrove (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/430,021

(22) Filed: Oct. 29, 1999

(51) Int. Cl.[7] .................................................. G06K 9/00
(52) U.S. Cl. ...................................... 362/162; 382/167
(58) Field of Search ............................... 382/162, 167; 358/518, 519, 523; 345/603, 604

(56) References Cited

U.S. PATENT DOCUMENTS

| | | | | |
|---|---|---|---|---|
| 5,432,906 A | | 7/1995 | Newman et al. | ............. 395/162 |
| 5,668,890 A | * | 9/1997 | Winkelman | ................. 382/167 |
| 5,699,489 A | | 12/1997 | Yokomizo | .................... 395/109 |
| 5,828,470 A | | 10/1998 | Maeda et al. | ................... 395/1 |
| 6,456,293 B1 | * | 9/2002 | Grandy | ........................ 382/167 |
| 6,546,132 B1 | * | 4/2003 | Bhattacharjya et al. | ..... 382/167 |

OTHER PUBLICATIONS

C.A. Poynton, "Frequently Asked Questions about Color", ftp.inforamp.net/pub/user/poynton/doc/colour/ColorFAW-.pdf, 1997.

* cited by examiner

Primary Examiner—Phuoc Tran
(74) Attorney, Agent, or Firm—Fitzpatrick, Cella, Harper & Scinto

(57) ABSTRACT

Disclose are various methods for optimising conversions between color spaces (FIG. 1). A set of atomic mathematical ((a)–(f)) functions are identified which, when performed in sequence, implement the conversions. Specific (first) sequences of the mathematical functions are then identified which when preformed convert colors between particular color spaces. A set of computational operations ((g)–(i)) are then established for evaluation using a computing device, the operations, when performed in (second) sequences cause the color conversions. A particular one of the first sequences required for converting from a first color space to a second color space is then identified and transformed into a (third) sequence of computational operations chosen from the computational operations ((g)–(i)) having substantially the same transformation effect as the particular sequence. Also disclosed is a method of sequentially combining a first color conversion list (FIG. 2A) with a second color conversion list (FIG. 2B) to form a single output conversion list (FIG. 2C) having a corresponding conversion function, each conversion list traversing a chain of color spaces comprising at least a corresponding source color space and a corresponding terminal color space. Also disclosed is a method of determining a processing gamut for intermediate color spaces (304, 306) traversed in a color conversion chain (300) from a source color space (302) to a target color space (308).

54 Claims, 6 Drawing Sheets

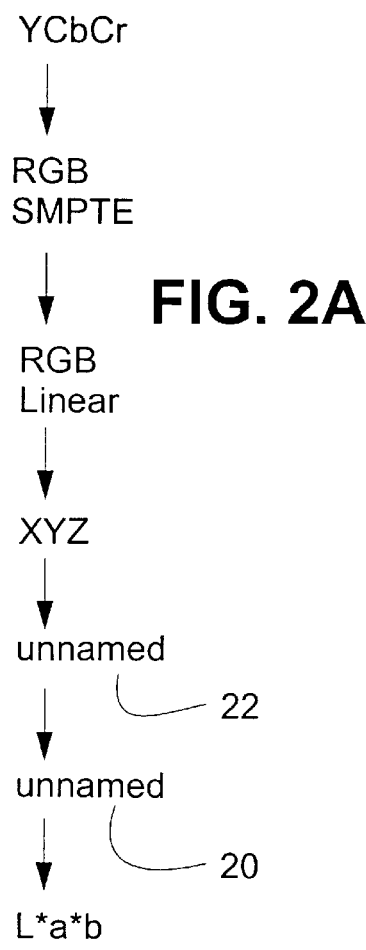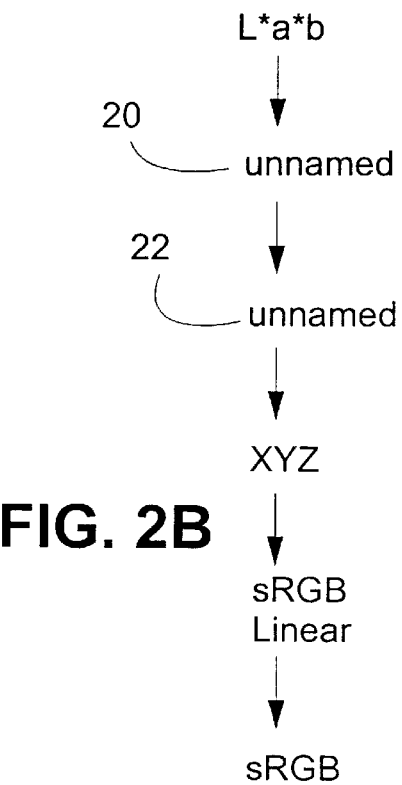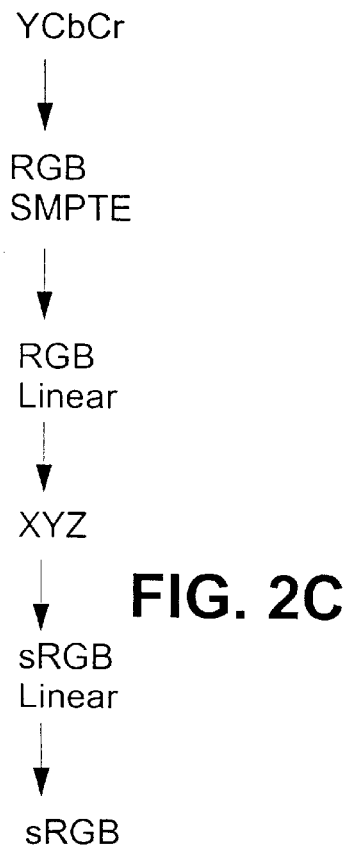

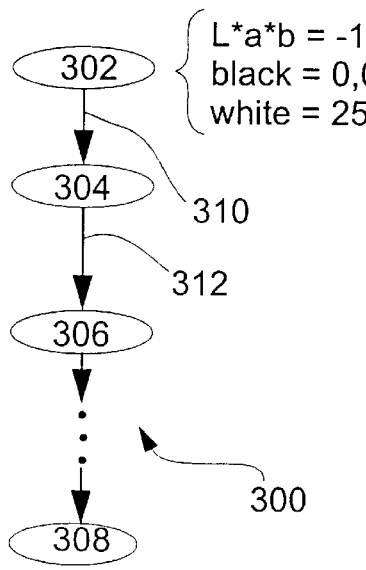
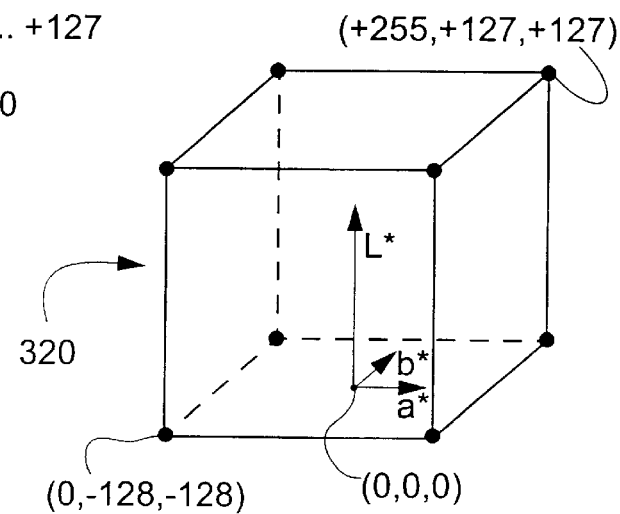
FIG. 3A  FIG. 3B
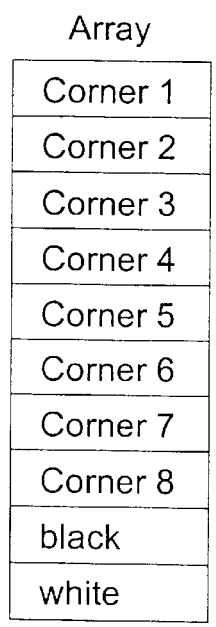
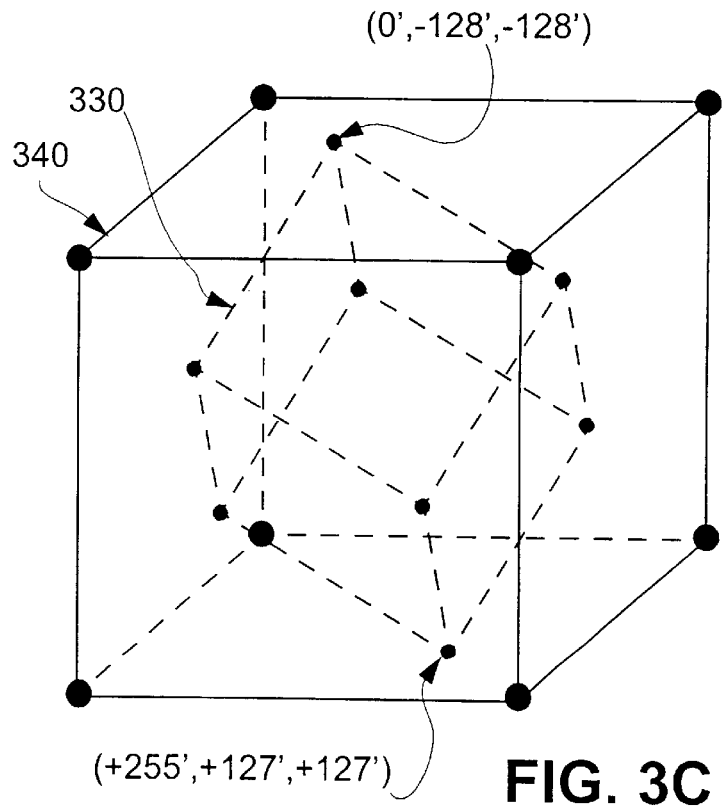
FIG. 3D  FIG. 3C

CONVERSIONS BETWEEN STANDARD COLOR SPACES

COPYRIGHT NOTICE

This patent specification contains material which is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to conversions between colour spaces and, in particular, to the provision of a generalised colour space management and conversion tool that enables optimised work between arbitrary colour spaces. The present invention also relates to a method and apparatus for colour space management and conversion. The invention also relates to a computer program product including a computer readable medium having recorded thereon a computer program for colour space management and conversion.

BACKGROUND

Modem computer systems are progressively required to support more and more colour spaces, with many of those colour spaces being derived from the calibrations of scanners, printers, and monitors, each of which may be described in a variety of forms. For effective and accurate operation, computer systems must be able to convert data between any of these colour spaces efficiently and accurately. The programming task of supporting efficient colour space conversions grows as the square of the number of colour spaces supported unless some generalised scheme is employed.

One shortcut is to implement only conversions to and from some standard colour space. CIE XYZ is an example of one standard colour space that may be used in such a manner, amongst others. However, such requires that two conversions be performed for most colour space conversions. In particular, one conversion from the source colour space into the standard space and another conversion out of the standard colour space into the target colour space. Since colour conversions generally involve individual conversion of every pixel in an image, the efficiency of the conversion is often extremely important.

Further, the technology required to perform such conversions varies over different computer platforms and is also rapidly changing. The required accuracy for such conversions also varies between computer systems.

As understood by the present inventor, prior art colour conversion systems may operate using one of two arrangements. A first arrangement involves having a conversion function between two colour spaces stored in memory whereby individual conversions are performed by examining discrete values form the memory. This is effectively a look-up table. This arrangement has a number of problems. Importantly, at least one table is required to be known for each colour space conversion to be performed, thus constraining the scope of conversions and giving rise to a need to store a large number of values so as to be generally useful. In addition to occupying large amounts of memory, such increases access times causing the conversion to proceed more slowly. Look-up tables are also constrained by fixed limitations of accuracy.

A second arrangement involves mathematically calculating the conversion function for each colour value to be converted. Whilst avoiding the memory problem of the above arrangement, this can increase the conversion time for complicated functions. Further, such requires processors dedicated or configurable to specific conversions, which again may constrain the number of conversion functions required to be handled.

A further issue associated with colour conversion is the time at which the conversion takes place. The look-up table approach described above in fact implements the conversion function off-line, which results in the formation of the table in memory. A mere look-up of the table can then occur at run-time (ie. when individual conversions are required). The calculation approach is performed at run-time, but may be slow, particularly where the computing platform is not configured to efficiently handle the required accuracy of colour conversion. In some cases, the two approached may be married where, upon loading the particular application, the calculation approach is used to create conversion tables used by the application at run-time. Such an approach is some way addresses the problems of permanent storage and conversion speed.

It is an object of the present invention to substantially overcome, or at least ameliorate, one or more deficiencies associated with existing colour space conversion approaches so a to optimise the colour conversion process.

DISCLOSURE OF THE INVENTION

According to a first aspect of the invention, there is provided a method of optimising conversions between colour spaces, said method comprising the steps of:
 (i) identifying a set of mathematical functions which, when performed in sequence, implement said conversions between colour spaces;
 (ii) identifying a set of computational operations for evaluation using a computing device, said operations, when performed in (first) sequence cause said colour conversions;
 (iii) identifying at least one particular sequence of said mathematical functions which when preformed converts colours between a first colour space and a second colour space;
 (iv) transforming said particular sequence into a (second) sequence of computational operations chosen from said set of computational operations having substantially the same transformation effect as said particular sequence.

Preferably, steps (iii) and (iv) are performed at a time at which a colour conversion is requested (run-time).

According to a another aspect of the invention, there is provided a method of sequentially combining two sequences of mathematical functions to form a single sequence which has the same effect of said two when executed, said method comprising the steps of:
 (a) comparing a last function of a first said sequence and a first function of a second said sequence;
 (b) removing both said functions from said lists if said functions are the mathematical inverse of one another;
 (c) repeating steps (a) and (b) until the two said functions are not the mathematical inverse of one another; and
 (d) combining the two sequences at a current last function of the first sequence and at a current first function of the second sequence.

According to another aspect of the invention, there is provided an apparatus for implementing the aforementioned methods.

According to another aspect of the invention there is provided computer program product including a computer readable medium having recorded thereon a computer program for implementing the methods. Other aspects of the invention are also disclosed.

BRIEF DESCRIPTION OF THE DRAWINGS

A number of preferred embodiments of the present invention will now be described with reference to the drawings, in which:

FIGS. 2A to 2C depict the optimisation of multiple colour conversion lists into a single colour conversion list;

FIGS. 3A to 3D illustrate the optimisation of look-up table input ranges;

DETAILED DESCRIPTION INCLUDING BEST MODE

Figure 1:
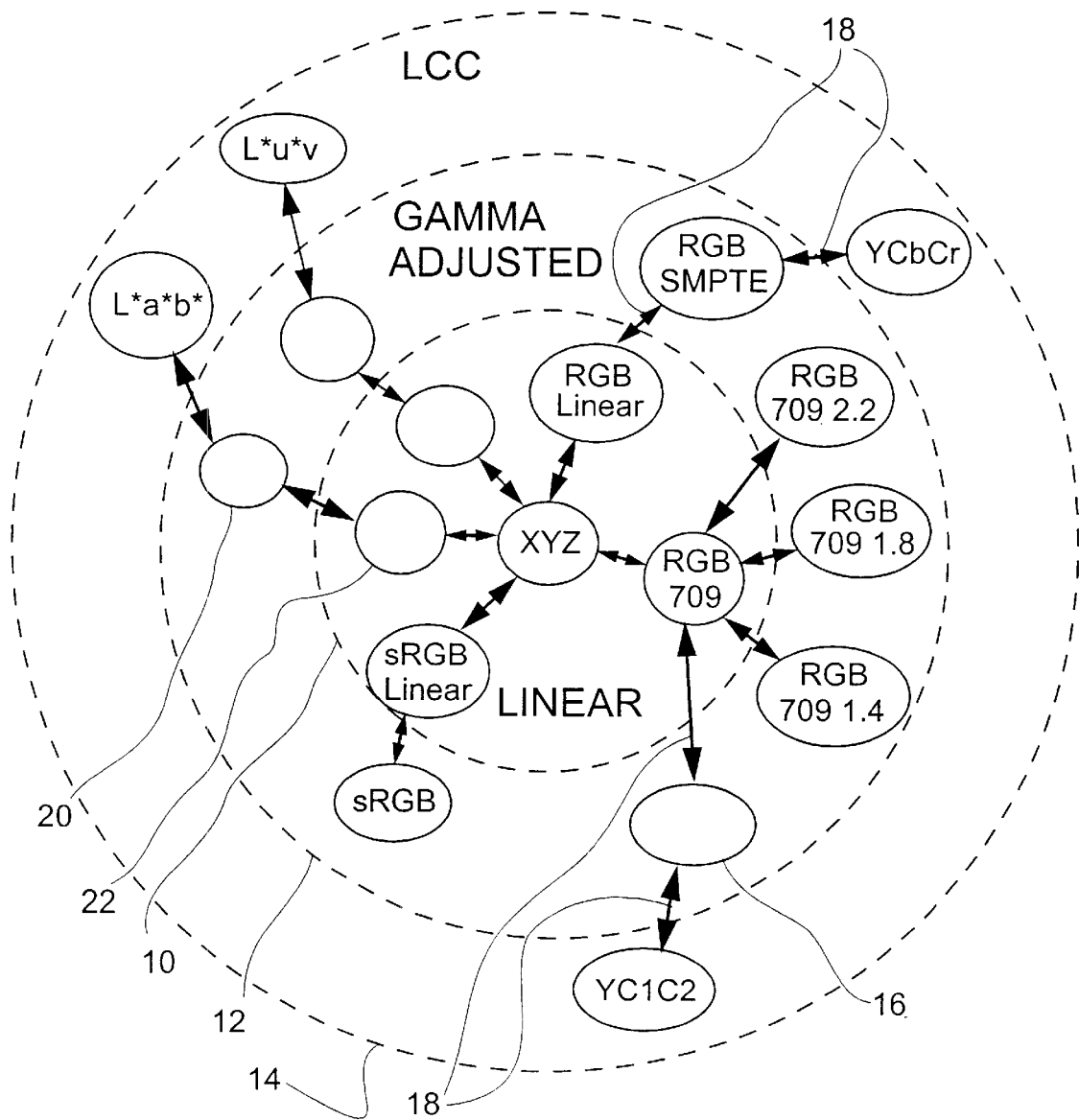
FIG. 1 is a diagram illustrating the relationship between a number of standard colour spaces.

FIG. 1 shows a representation of the relationship between a number of common colour spaces encountered in modern image processing and reproduction. FIG. 1 shows a number of colour spaces organised according to particular groups having common characteristics. A first group 10 defines colour spaces that are linear in light-power and has at its origin the CIE XYZ standard colour space (hereinafter the "XYZ space"). With the XYZ space, because the space is linear in light-power, in an 8-bit implementation, the human perception of the difference between (0,0,0) and (1,1,1) is very visible, whilst the difference between (240,240,240) and (255,255,255) is barely visible. As a consequence, the XYZ space has been found useful for theoretical purposes and some computations. However, practitioners find the XYZ space generally not useful for image storage.

Other linear colour spaces as illustrated exist and are used to ameliorate some deficiencies of the XYZ space and hardware limitations. One example is the RGB Linear space which can be computed using a 3×3 matrix from the XYZ space by:

$$\begin{bmatrix} R \\ G \\ B \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} X \\ Y \\ Z \end{bmatrix}$$

Conversions within the linear space 10 may be simply performed using matrix multiplications.

Situations however arise where a colour space requires a non-linear response, often in order to account for non-linearities in image processing or reproduction equipment. One example is the cathode ray display where the phosphorescence varies with the energy of the electron beam. In these situations, the colour space is modified by a gamma function to linearise the response of the cathode ray display. Such modifications give rise to a gamma adjusted group 12 of colour spaces as seen in FIG. 1 which is seen to include a number of members, one being the sRGB space common used in video displays of computer systems. The conversion between a space in the linear group 10 and a space in the gamma adjusted group 12 may be performed using a single variate function defined for the target colour space. In some implementations, the function may be incorporated in the computer system as a look-up table of values.

A third group of colour spaces is the Luminance Chroma Chroma (LCC) group 14 also seen in FIG. 1. The group 14 includes the YCrCb space that is used widely in television broadcasts and the JPEG image compression standard. A space in the LCC group 14 may be obtained by means of a matrix multiplication from a related space in the gamma adjusted group 12.

It is further apparent from FIG. 1 that the individual relationships 18 between the various colour spaces define various conversion paths for colour space transformation. The conversion paths, in some cases, traverse otherwise unnamed but nonetheless useful colour spaces such as the gamma adjusted space 16 interposed between the LCC space YC1C2 and the Linear space RGB 709.

Those skilled in the art will appreciate that other colour spaces, not represented in FIG. 1, exist and, as will be apparent from the following description, may be manipulated according to the present invention without limiting the generality thereof. For example, FIG. 1 depicts only additive colour spaces whereas the principles of the present invention may be applied to subtractive colour spaces such as CMY, and also to device dependent colour spaces.

In working with colour systems, the present inventor has determined that conversions between colour spaces can be optimised, as compared with the direct and computationally expensive approach of processing along the relationships 18 that define the conversion paths. Specifically, optimised conversions need to take account of the computational accuracy of the (sometimes intermediate) target colour space. For example, the XYZ space typically requires a 16-bit data representation for each colour component to provide a useful representation. Other spaces such as RGB Linear may utilize 8, 12 or 16-bit representations depending on the particular implementation.

The preferred embodiment provides a generalised colour space management and conversion tool that enables optimisation of the task of converting between arbitrary colour spaces. The preferred embodiment includes three distinct Modules for such conversions. The Modules may be respectively summarised as follows:

1. a method of mathematically defining colour space conversions and a method of creating optimised conversions with controlled accuracy that can be accelerated on any specific hardware of known computational precision;
2. a method of composing two colour conversions into a single optimised colour conversion; and
3. a means for determining the optimum gamut for intermediate colour spaces so that the size of look up tables can be minimised without artificial gamut restrictions.

The combined effect of these Modules results in:
(a) a method of optimising the conversion of colour data between any two arbitrary colour spaces without the computational overhead of converting via a standard colour space and without the development overhead of separately coding each conversion;
(b) a method of separating the definition of the colour space conversions from the platform on which they will run and allowing the optimisation to be performed at run-time depending on the available hardware; and (c) a method of conveniently controlling a compromise between speed and accuracy of colour conversions on any given platform.

Terminology

The following terminology is used in this description:

"Colour n-tuple":

Colours are represented by n-tuples in a colour space. For example, [L*,a*,b*] colours are represented by triples and many printer specific colour spaces use [C, M, Y, K] as a 4-tuple. n-tuples with more than 4 or less than 3 components are also possible. Specifically a grey scale colour space has an n-tuple with a single component, and colour values for multi-ink printers can have for example nine or even more components in their corresponding n-tuple.

"Mathematical function set":

A set of mathematical functions that can be applied in various sequences to define colour space conversions. Each function takes a colour n-tuple as input and produces a colour n-tuple as output. The number of components of the input and output n-tuples can be different. Each instance of any function in a sequence has parameters defined for that instance. They are, amongst other things, an output range for each channel and a precision required for each channel. For standard colour space conversions, these functions are typically gamma operations and matrix multiplication operations. For other purposes, conversions from polar to Cartesian systems, general multi-variate (MV) functions, non-gamma single-variate functions, one-dimensional (1D) look-up tables, multi-dimensional look-up tables and others may be defined. Functions relating to device calibrations may be defined.

"Colour conversion list":

An ordered list of mathematical functions from the above set, which together define a conversion from one colour space to another. An empty colour conversion list defines an identity colour conversion. Any function can be used more than once in any sequence, generally with different parameters on each use. The list can be interpreted directly to calculate colour conversions using floating point arithmetic. Such a process is not fast but has maximum accuracy.

"Conversion platform definition":

A set of computational operations that can be used to implement colour conversion on a specific computer. These operations operate on n-tuples expressed in vectors of integers and are designed for efficient computer implementation. These conversion operations typically include 1D look-up tables, matrix operations and MV look-up tables (e.g. 3D) and have a fixed and known precision. In the case of specific hardware accelerated implementations, specific combinations of operations may also exist. A variety of interpolation techniques may be employed for multi-dimensional look-up tables.

"Optimised conversion list":

An ordered list of computational operations from a conversion platform definition. An empty optimised conversion list defines an identity colour conversion. This list can be interpreted by the target hardware to perform colour conversion operations on image pixels. The operations are generally on integer values, for example described in an 8, 12 or 16 bit format. In the case of a list created for software operation, each list entry will generally contain a pointer to a function that is optimised to perform that particular conversion.

"Optimisation":

The process of converting a colour conversion list to an optimised conversion list.

"Composition":

The process of combining a pair of colour conversion lists into a single colour conversion list with the same mathematical effect as performing each conversion in sequence. The number of entries in the composed list will be no greater than the sum of the two lists, but may be considerably fewer. It may also be zero where the two lists are the functional inverse of one another.

Module 1

This Module provides a method of mathematically defining colour space conversions and a method of creating optimised conversions for execution on specific hardware with controlled accuracy. Although Module 1 may be used to create optimum conversion schemes for conversion between standard colour spaces, Module 1 can also operate on any colour space conversion definition. Such definitions can include components for any or all of chroma keying, device calibration, standard colour space conversion or artistic effects. Other types of colour operations may also be accommodated. The technique may be used to create accelerated lists and lists for conversion in software on the computer system.

Module 1 may be described in terms of an algorithm having inputs comprising a colour conversion chain, that describes the rigorous mathematical steps of the colour conversion to be optimised, and a conversion platform definition, that describes the accuracy limitations and operations available on the hardware on which the conversion is to be executed. Module 1 has outputs that comprise an optimised conversion chain, which can be executed by the nominated hardware. The mathematical function set used in Module 1 contains a number of elements, indicated below:

(a) Single variate functions (e.g. as used for gamma implementation), where some or all of the elements of the colour vectors have a single variate function that operates upon them. A pointer to the function is stored and the function is executed whenever it is required to be evaluated. Such a function is of the form:

$$\begin{bmatrix} C'_1 \\ C'_2 \\ \ldots \\ C'_n \end{bmatrix} = F\left(\begin{bmatrix} C_1 \\ C_2 \\ \ldots \\ C_n \end{bmatrix}\right) = \begin{bmatrix} f(C_1) \\ f(C_2) \\ \ldots \\ f(C_n) \end{bmatrix}. \quad (1)$$

The function (f) may be a gamma function or alternatively any single variate function for purposes such as chroma-keying, colour adjustment, and luminance adjustment for example. This information is stored for later use. Further, an indicator of the gamma function type, its gamma value and a forward/backward indicator are preferably also stored.

(b) Single variate functions according to Equation (1) above where the function definition is supplied as a look-up table.

(c) Multi-variate (MV) functions (e.g. for headroom compression of the YC1C2 colour space) where all output channels depend on all input channels. Typically, MV functions for colour are 3-dimensional (e.g. red, green, blue). A pointer to the function is stored and the function is executed whenever it is required to be evaluated.

$$\begin{bmatrix} C'_1 \\ C'_2 \\ \dots \\ C'_n \end{bmatrix} = F\left(\begin{bmatrix} C_1 \\ C_2 \\ \dots \\ C_n \end{bmatrix}\right) = \begin{bmatrix} f_1(C_1, C_2, \dots, C_n) \\ f_2(C_1, C_2, \dots, C_n) \\ \dots \\ f_n(C_1, C_2, \dots, C_n) \end{bmatrix} \quad (2)$$

(d) Multi-variate functions according to Equation (2) above where the function definition is supplied as a multi-variate look-up table (MV-LUT).

(e) Matrix multiplication operations of the form:

$$\begin{bmatrix} C'_1 \\ C'_2 \\ \dots \\ C'_n \end{bmatrix} = \begin{bmatrix} a_{11} & a_{12} & \dots & a_{1n} \\ a_{21} & a_{22} & \dots & a_{2n} \\ \dots & \dots & \dots & \dots \\ a_{n1} & a_{n2} & \dots & a_{nn} \end{bmatrix} \begin{bmatrix} C_1 \\ C_2 \\ \dots \\ C_n \end{bmatrix} \quad (3)$$

(f) Matrix multiplication operations of the form of Equation (4) below where the n+1$^{th}$ column and the n+1$^{th}$ element of the input colour vector are used to effectively add constants to the elements of the colour vector.

$$\begin{bmatrix} C'_1 \\ C'_2 \\ \dots \\ C'_n \end{bmatrix} = \begin{bmatrix} a_{11} & a_{12} & \dots & a_{1n} & a_{1n+1} \\ a_{21} & a_{22} & \dots & a_{2n} & a_{2n+1} \\ \dots & \dots & \dots & \dots & \dots \\ a_{n1} & a_{n2} & \dots & a_{nn} & a_{nn+1} \end{bmatrix} \begin{bmatrix} C_1 \\ C_2 \\ \dots \\ C_n \\ 1 \end{bmatrix} \quad (4)$$

Each data structure above which represents a mathematical function, contains the information pertaining to the nature and parameters of the function itself and an indicator of the precision with which the result must be stored in order to satisfy the limits imposed by human visual colour acuity. The mathematical function set of (a) to (f) above define atomic operations which, according to the preferred embodiments, may be combined in a fashion to provide an optimised set of operations from which the conversion between colour spaces may be performed. The operations of the mathematical function set are intended for computation using floating point precision.

The operation function set of Module 1 comprises the following elements:

(g) Matrix multiplication with 'addition' column, $$\begin{bmatrix} C'_1 \\ C'_2 \\ \dots \\ C'_n \end{bmatrix} = \begin{bmatrix} a_{11} & a_{12} & \dots & a_{1n} & a_{1n+1} \\ a_{21} & a_{22} & \dots & a_{2n} & a_{2n+1} \\ \dots & \dots & \dots & \dots & \dots \\ a_{n1} & a_{n2} & \dots & a_{nn} & a_{nn+1} \end{bmatrix} \begin{bmatrix} C_1 \\ C_2 \\ \dots \\ C_n \\ 1 \end{bmatrix} \quad (5)$$

(h) 1D-LUT, where separate look-up tables can be generated for each colour channel, or all channels can reference a single look-up table; and (i) MV-LUT: The MV-LUT can use various interpolation techniques. Tetrahedral or tri-linear interpolation techniques are examples of some that may be often used.

Of the atomic operations of the mathematical function set, Equations (1) and (2) become cumbersome for high speed operation (for example where a complete image must be converted). Further, the atomic operations of (a) to (f) above were chosen not for computational efficiency, but rather for their combined ability to implement all conversions between colour spaces and other colour manipulations (e.g. chroma-keying). According to Module 1, a method of reducing the mathematical function set for the conversion to the operation function set is provided which meets a required accuracy or is of an optimal accuracy in the target colour space. For this to occur, it is necessary to specify, for each utilised member of the mathematical function set, a minimum precision (usually as a number of bits) for each conversion. Further, where the hardware upon which Module 1 is being implemented is not configured to operate at that level of precision, Module 1 operates to ensure conversion to that level of precision. Where this is necessary, the algorithm of Module 1 creates a 3-dimensional look-up table to account for the hardware limitations.

Accordingly, for a conversion between two arbitrary colour spaces, a colour conversion list is formed comprising those functions of the mathematical function set required to perform the conversion. Those functions are then able to be converted. The conversion may be implemented by means of a state machine, having a number of states as specified in Table 1 below:

TABLE 1

| Name of State | Meaning of State |
|---|---|
| State_A | No operation generation is in progress. |
| State_B | The generation of a matrix operation (g) is in progress and the number of bits required for the output of the operation (g) are more than is available. |
| State_C | The generation of a matrix operation (g) is in progress and the number of bits required for the output of the operation are less than or equal to the number that are available. |
| State_D | The generation of an MV-LUT operation (i) is in progress and the number of bits required for the output of the operation are more than are available. |
| State_E | The generation of an MV-LUT operation (i) is in progress and the number of bits required for the output of the operation is less than or equal to the number that are available. |
| State_F | The generation of a 1D-LUT operation (h) is in progress and the number of bits required for the output of the operation are more than are available. |
| State_G | The generation of a 1D-LUT operation (h) is in progress and the number of bits required for the output of the operation is less than or equal to the number that are available. |

State_B is included in Table 1 for the sake of completeness. State_B is not used in the processing of the embodiments described herein.

The operation of the state machine may be described by Pseudo-Code 1 below:

Pseudo-Code 1:
Set state to State_A
Loop over functions in input function list
    Perform state table function
End loop
Switch on state
    Case State_A:
        Break
    Case State_B or State_C:
        Output the matrix
        Break
    Case State_D or State_E:
        Output the MV-Lut
        Break Case State_F or State_G:
   Output the 1D-Lut
   Break
End switch Thus the state machine classifies the various mathematical functions in the colour conversion list. Having been interpreted by the state machine, the entries in the colour conversion list are then processed according to a state transition and action table, seen as Table 2, below. Table 2 provides a correlation between a current state, corresponding to the states listed in Table 1, and reference condition related to a next function to be processed in the colour conversion list. The next function will be one of the atomic operations (a) to (f) forming the mathematical function set. The accuracy of the next function (ie. the number of bits required for output by the next function) is compared with a value Avail representing the number of bits available for processing on the current hardware platform, to establish the reference condition. When the reference condition of the next function is established, this is correlated using Table 2 with the current state to define one or more operations according to operation function set (g) to (i) which are used to convert colour data from State_G, and State_B, then Table 2 requires that the 1D-LUT is converted to a MV-LUT and the Matrix is folded into the MV-LUT. This folding is achieved by multiplying each entry in the MV-LUT by the matrix. Since the MV-LUT may be considered a vector, the result of multiplication by the matrix is also a vector. The result of the conversion is a single function represented by a MV-LUT which embodies the original two functions.

Table 2 accommodates the situation, in a number of special cases, where the 1D-LUT or single variate (SV) function provides an output having a greater number of bits than are able to be handled. In such situations, a process corresponding to Pseudo-Code 2 below is performed.

Pseudo-Code 2:
Place gamma function into 1D-LUT
New State←State_F
Loop over remainder of mathematical function list
   If the function is a SV Function
      If the required bits<=Avail AND (the mathematical inverse of the SV function is known)
         Fold the function into the 1D-LUT
         Write out the 1D-LUT
         Put the inverse of the SV function into a new MV-LUT

TABLE 2

STATE TRANSITION AND ACTION TABLE FOR MODULE 1

| CURRENT STATE | NEXT FUNCTION OF MATHEMATICAL FUNCTION SET IN COLOUR CONVERSION LIST | | | | | |
|---|---|---|---|---|---|---|
| | (a) or (b) <= Avail | (a) or (b) > Avail | (e) or (f) <= Avail | (e) or (f) > Avail | (c) or (d) <= Avail | (c) or (d) > Avail |
| State_A | Start 1D-LUT (Operation (h)) New State = G | See Pseudo Code 2. | Start matrix. (Operation (g)) New State = C | Create empty MV-LUT. (Operation (i)) Fold in matrix New State = D | Create MV-LUT from Function/LUT. New State = E | Create MV-LUT from Function/LUT. New State = D |
| State_G | Fold in 1D-LUT. New State = G | Fold in 1D-LUT. New State = D | Write 1D-LUT. Start Matrix. New State = C | Create MV-LUT from 1D-LUT. Fold in matrix. New State = D | Create MV-LUT from 1D-LUT. Fold in MV-LUT. New State = E | Create MV-LUT from 1D-LUT. Fold in MV-LUT. New State = D |
| State_F | Fold in 1D-LUT. New State = G | Fold in 1D-LUT. New State = D | Create MV-LUT from 1D-LUT. Fold in matrix. New State = E | Create MV-LUT from 1D-LUT. Fold in matrix. New State = D | Create MV-LUT from 1D-LUT. Fold in MV-LUT. New State = E | Create MV-LUT from 1D-LUT. Fold in MV-LUT. New State = D |
| State_C | Write matrix. Start 1D-LUT. New State = G | Write matrix. See Pseudo Code 2 | Fold matrix into matrix. New State = C | Create empty MV-LUT. Fold existing matrix in. Fold new matrix in. New State = D | Write matrix. Create MV-LUT from Function/LUT New State = E | Write matrix. Create MV-LUT from Function/LUT New State = D |
| State_D | Fold 1D-LUT in. New State = E | Fold 1D-LUT in. New State = D | Fold matrix in. New State = E | Fold matrix in New State = D | Write MV-LUT Create MV-LUT from Function/LUT New State = E | Write MV-LUT Create MV-LUT from Function/LUT New State = D |
| State_E | Write MV-LUT Start 1D-LUT New State = G | Write MV-LUT. See Pseudo Code 2. | Fold matrix in. New State = E | Write MV-LUT. Create empty MV-LUT. Fold in matrix. New State = D | Write MV-LUT. Create MV-LUT from Function/LUT. New State = E | Write MV-LUT. Create MV-LUT from Function/LUT. New State = D | one colour space to another. In each correlation, a new state is established which is used as the current state of an immediately following colour conversion operation according to Module 1.

Table 2 provides a preferred operation of Module 1, in which, when the algorithm commences, the state is State_A. As an example of operation, where the colour conversion list includes two functions providing conversion states New State←State_E
      Break from Loop
   End if
  End if
  If required bits<=Available bits
     Break from Loop
  End if
End loop In a number of instances of colour conversion, it is appropriate to consider the issue of RGB→RGB interpolation error minimisation. Consider the following circumstances:

(i) a conversion is required between two RGB spaces with different colourants and possibly different gammas (such as the RGB SMPTE colour space and the RGB NIF colour space); and (ii) that conversion is to be done using 1D-LUT and MV-LUT operations that are limited to 8 bit precision.

In this case, the optimum conversion chain is a single 1D-LUT followed by a MV-LUT where the functions they contain can be determined as follows. The conversion is $$G_1^{-1} \to M_1^{-1} \to M_2 \to G_2 \quad (6)$$

where M→G represents the matrix and gamma conversion from XYZ to an RGB space; and $G^{-1} \to M^{-1}$ is the inverse of M→G. This is mathematically equivalent to:

$$G_1^{-1} G_2 \to G_2^{-1} \to M_1^{-1} \to M_2 \to G_2 \quad (7)$$

Equation (7) may be broken down to give:

$$\begin{bmatrix} G_1^{-1} \to G_2 \\ 1D-LUT \end{bmatrix} \to \begin{bmatrix} G_2^{-1} \to M_1^{-1} \to M_2 \to G_2 \\ 3D-LUT \end{bmatrix} \quad (8)$$

Figure 5:
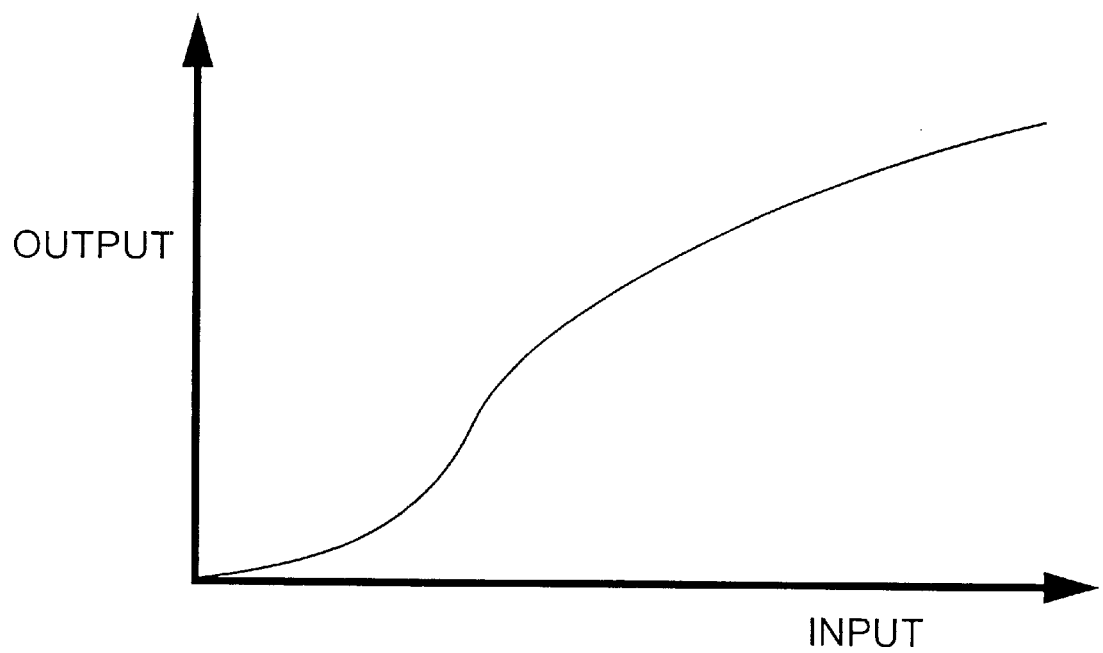
FIG. 5 is a compound transfer function indicative of a modified transfer function according to Module 1.

In the case where the gamma functions are different shapes, the advantage over a single MV-LUT is greatest. For example, the SMPTE gamma function is a pure power function but the NIF gamma function has a linear part close to zero. The resulting compound function, represented by the left hand side of Expression 8 above is somewhat "spoon" shaped, as illustrated in FIG. 5. Pseudo-Code 2 discussed above implements this function.

Example of Module 1 Conversion

A conversion of colours from the L*a*b* colour space to the sRGB colour space requires the following operations be performed on each colour:

$$L*a*b* \xrightarrow[matrix]{} X'Y'Z' \xrightarrow[gamma]{} XYZ \xrightarrow[matrix]{} sRGB\ linear \xrightarrow[gamma]{} sRGB \quad (9)$$

where X'Y'Z' represents an intermediate colour space which is formed from the XYZ colour space using the following component of the CIE L*a*b* definition:

If $X/X_n < 0.008856$ $X' = X/X_n * 7.787$ else $X' = (X/X_w)^{1/3}$ where $X_w$ is the X component of the white point. The same operations apply for each of the Y and Z channels of the colour space.

It is possible to therefore consider the above conversion implemented on each of the three hardware platforms noted in Table 3 below.

TABLE 3

| Hardware platform | Best conversion method |
| --- | --- |
| A device that allows 16 bits of precision for all intermediate values (eg. personal computer system software). | A matrix, 1D-LUT, matrix and final 1D-LUT. This reflects the input operations closely. |
| A 16 bit device on which matrix operations are not available (or perhaps a conversion faster than 2 above is required). | The first three operations can be combined into a single MV-LUT with minor accuracy loss The final 1D-LUT remains. |
| A device with a limit of 8 bits of precision on all intermediate values | A single MV-LUT. |

The above cases are listed in decreasing order of conversion accuracy. Where a user/caller constructs an arbitrary set of mathematical functions for performing a specific operation if his own requirement, a further variety of operation combinations is possible. With respect to the second item in Table 3, whilst speed constraints are not directly addressed in the state table, Table 2, the platform mentioned may be used to achieve the colour conversion.

Module 2

This Module provides a method of composing two colour conversion lists into a single optimised colour conversion list, and uses the two colour conversion lists as inputs and outputs a single colour conversion list having the same mathematical effect. This type of situation may occur, for example where an image provided in YCrCb is being rendered in L*a*b* but is to be printed on a device having calibration information in sRGB, as exemplified in FIGS. 2A and 2B. FIG. 2A shows the colour spaces traversed by a colour conversion list for converting from YCbCr to L*a*b* according to the relationships 18 of FIG. 1, which also includes reference to a number of unnamed colour spaces 20 and 22. Similarly, FIG. 2B shows the chain of colour spaces traversed by a colour conversion list for a conversion from L*a*b* to sRGB. It will be seen from FIGS. 2A and 2B that a number of interim colour spaces are common to each chain. Module 2 acts to identify those conversions, which are redundant, and omit those conversions from a joining of the two colour conversion lists represented in FIG. 2C. This results in a more efficient application of Module 1 to the chain of FIG. 2C than would be obtained by applying to FIGS. 2A and 2B. The XYZ space is common to each (input) colour conversion list, that space being required to be traversed by the output colour conversion list of FIG. 2C since it provides the necessary link between the RGB Linear and the sRGB Linear spaces. Module 2 in this regard operates to avoid redundant conversions rather than traversal of specific colour spaces, although such may arise from implementation of Module 2. Module 2 may be practised on any number of input colour conversion lists.

The algorithm performed by Module 2 is described in Pseudo Code 3 below, which processes adjacent pairs of colour conversion lists, whereby the output list from one pair can be treated as a first list of a next pair.

Pseudo Code 3

P1 points to last entry in first list.
P2 points to first entry in second list.
Matching=TRUE
While P1 and P2 are both not NULL and Matching
  Matching=FALSE (just to make termination easier)
  If P1 operation type !=P2 operation type Break;
  Switch on operation type
  Case Matrix
    Multiply matrices
    If result is identity matrix
      Matching=TRUE
  Case SV Function
    If P1 function and P2 function are Gamma

```
If Gamma function types/gamma values match
    If P1 and P2 are opposite directions
        Matching=TRUE
    End if
  End if
End if
Case 1D-LUT
Case MV Function
Case MV-LUT
Default:
  (Each of these terminates the process. Matching is not set)
End switch
If Matching
  P1=previous operation in first list
  P2=next operation in second
End if
End while
Set output list to empty
If P1 !=NULL
  Add all operations from first list up to and including P1
  to end of output list
If P2 !=NULL
  Add all operations from P2 up to and including the last
  of the second list to the end of the output list
```

It is seen from Pseudo Code 3 that Module 2 examines the various operations in the lists in pairs from terminal operations (last of first list, first of the last list) outwards into the respective list, performing comparisons along the way. When a pair of operations is determined to be the mathematical inverse of one another, they are both deleted and the process continues on the next two operations because there is no necessity to compute the colours of the intervening colour space. When a pair of operations is determined not to be the mathematical inverse of one another, they must both remain and the processing stops. Any further optimisations will be implemented by Module 1. As an example, for a conversion from YC1C2 space to RGB 709 2.2 space, Module 2 avoids unnecessary processing via the XYZ space, only requiring the conversion to transit RGB 709 space whilst permitting Module 1 to reduce two gamma conversions to a single 1D-LUT.

Module 3

This Module provides a means of determining the optimum-processing gamut of intermediate colour spaces used in the conversion process so that the size of look-up tables (LUT's) can be minimised.

As discussed above, when converting colours, it is generally necessary to compute intermediate values, generally associated with an intermediate colour space. Often, these intermediate values are used as inputs to 1D-LUT's or MV-LUT's in the colour conversion processes, of Modules 1 and 2 for example. The gamuts (ie. the range of values) of many colour spaces are restricted due to constraints of the normal use of that space. However, when used as an intermediate space, the gamuts can be regarded as somewhat wider to allow for the conversion of more colours. For example, the YCbCr colour space and the L*a*b* colour space both have gamuts significantly larger than the RGB Linear colour space, even though RGB Linear is used as an intermediate space in the conversion between these spaces, as seen from FIG. 1. By extending the input range of the 1D-LUT, which is one of a number of functions used for example in YCbCr to L*a*b* conversion, as will be apparent from FIG. 1, it is possible to convert more colours without artificially clamping to the gamut of the RGB Linear space.

FIG. 3A shows a chain 300 of colour spaces 302, 304, 306 etc. linked by mathematical functions depicted by arrows 310, 312 etc, the optimisation of any of such operations may result in the creation or use of a LUT. When a LUT is produced, a specific limitation is placed upon the range of input values for that LUT. It is therefore important to know the input range for each intermediate stage so that the LUT's may be optimised and the missing of important values avoided. In FIG. 3A, for the operation 310 between colour spaces 302 and 304, a range of values for the colour space 302 is indicated, specifically in this case forming a cube-shaped gamut 320 having a range of values from (0,−128,−128) to (255,+127,+127), as seen in FIG. 3B. When that gamut 320 is acted upon by the operation 310 to convert to the colour space 304, which may include a multi-variate operation comprising a matrix multiplication, the gamut 320 may be altered to provide a new gamut 330 of altered orientation as seen in FIG. 3C. The gamut 330 becomes the minimum input range for the next operation 312 required to convert to the colour space 306. According to Module 3, an input gamut 340 of operation 312 is optimised to include the full extent of the gamut 330. The extent of the gamut 340 is determined by forming an array, seen in FIG. 3D, having entries corresponding to the verticies or corners of the gamut 320. The operation 310 can be applied to the eight discrete corner values and to two extreme values (black, white) to define the extent of values that may be input to the operation 312. The gamut 340 is determined by locating the extent of values into a range of values in the orientation of the target colour space for that operation.

Figure 6:
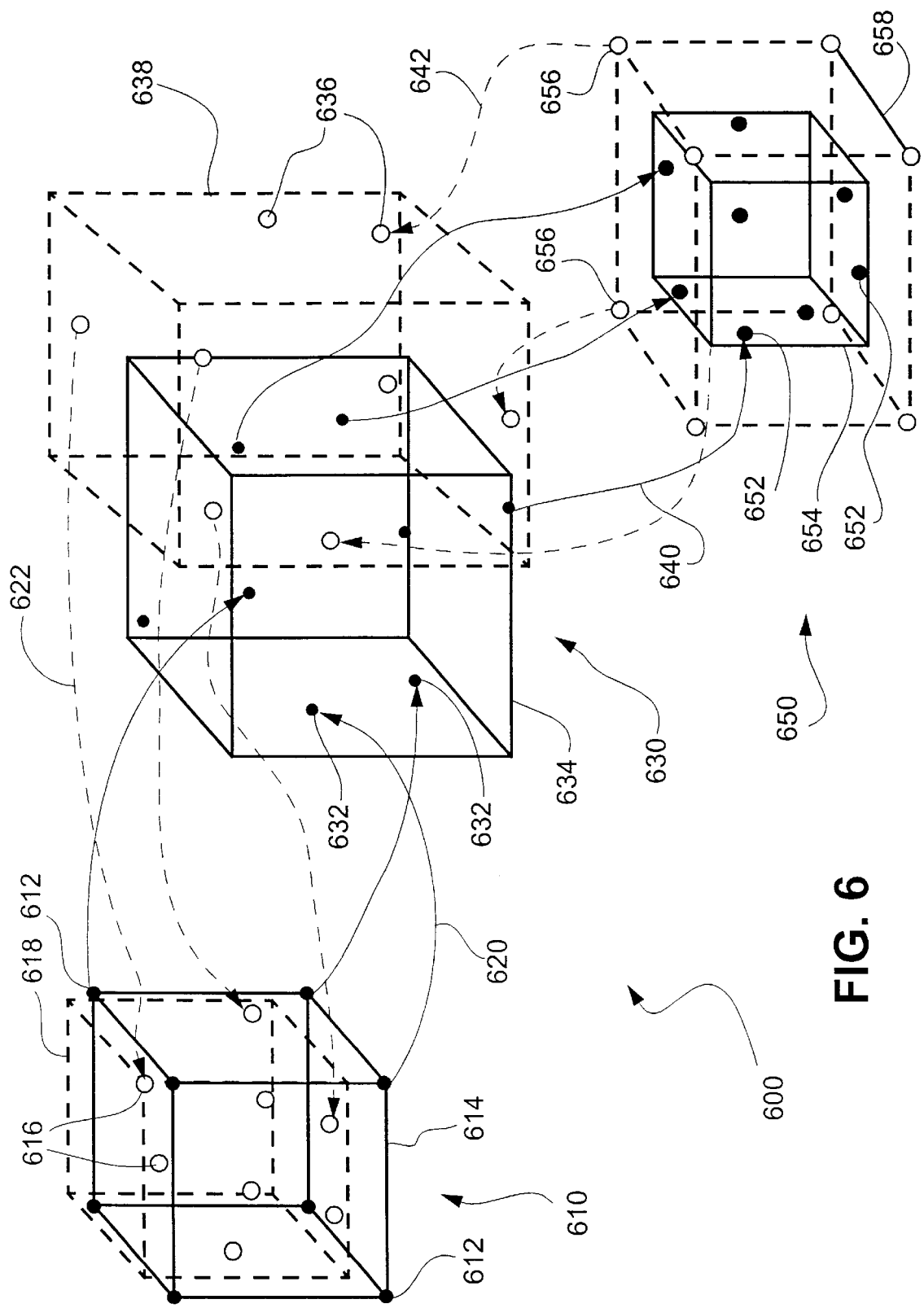
FIG. 6 depicts an example of forward and reverse gamut processing used in FIGS. 3A to 3D.

FIG. 6 depicts an example of the operation of Module 3 for forward and reverse processing 600 between a source colour space 610 and a target colour space 650, via an intermediate colour space 630. In FIG. 6, forward processing is illustrated by components represented by solid lines, and reverse processing by components having dashed, or broken lines.

Forward processing identifies salient or critical points 612, preferably being the corners of a box formed by the ranges of the input gamut of the source colour space 610. That input gamut may is represented by a box 614. A further two salient points are preferably added, those being black and white (which may or may not duplicate existing points). The salient points 612 are then transformed using a colour conversion function 620 into the intermediate colour space 630 to define corresponding salient points 632. A bounding box 634 is then determined to establish the smallest input gamut of the colour space 630 that encloses each of the points 632. The points 632 are then transformed using a colour conversion function 640 into the target colour space 650 to define corresponding salient points 652. A bounding box 654 is then determined to establish the smallest coordinate ranges in the colour space 650 that encloses each of the points 652.

Module 3 operates on the basis that whilst the bounding box 654 may be too small to enclose all the useful coordinates (colours) of the colour space 650, it will still enclose all the useful coordinates of the colour space 610 when that colour space 610 is transformed into the colour space 650 using the conversions 620 and 630.

This is seen in the example of FIG. 6 where reverse processing identifies salient or critical points 656 being the corners of a box formed by the ranges of the output gamut of the target colour space 650. A further two (black and white) salient points may also be defined as with the above. The salient points 656 are then transformed using a colour conversion function 642, being the inverse of the function 640, into the intermediate colour space 630 to define corresponding salient output points 636. A bounding box 638 is then determined to establish the smallest coordinate range in the colour space 630 that encloses each of the points 636. The points 636 are then transformed using a colour conversion function 622, being the inverse of the function 620, into the source colour space 610 to define corresponding salient output points 616. A bounding box 618 is then determined to establish the smallest coordinate range in the colour space 610 that encloses each of the points 616.

Module 3 then operates to identify the intersection between each pair of bounding boxes in each of the colour spaces 610, 630 and 650, such that the corresponding intersection defines the coordinate range to be used in the specific colour conversions required and hence the extent of any look-up tables that may be used in such conversions.

As with the previous modules, Module 3 can be described by an algorithm having an input comprising a (first) colour conversion list and an output comprising a (second) colour conversion list with coordinate range indications. Module 3 is described, using Pseudo Code 4 below, which depicts the sequence of method steps performed.

Pseudo Code 4

Allocate an array of 10 n-tuples where n is the largest n-tuple size that the system supports
Set the eight corners of the first output space into the array
Set white and black into the array
Create empty linked list of n dimension boxes with white and black
(Forward processing)
Loop over all operations in conversion list
   Determine enclosing box of 10 colours and add to linked list
   Convert all 10 colours using mathematical function of operation
End loop
Determine enclosing box of 10 colours and add to linked list
(Backward processing)
Set P1 to point to last entry in linked list
Set the eight corners of the output space into the array
Set white and black into the array
Loop backwards over all operations in conversion list
   Determine enclosing box of 10 colours in array
   Shrink enclosing box at P1 to intersection of this and the box just calculated
   If operation is invertible
     Convert all 10 colours using mathematical inverse of function of operation
     P1→predecessor of P1
   Else
     P1→predecessor of P1
     Set white and black from P1 into array
     Set eight corners of current space limits into array
   End if
End loop The linked list formed as described by Pseudo Code 4 at this stage contains optimal coordinate ranges for processing the various stages. MV and 1D-LUT's used to accelerate MV and SV functions can be set up to these ranges without risk of intermediate gamut compressions. Such provides an advantage since for example, there are considerable parts of most LCC spaces (e.g. L*a*b*, YC1C2, YCbCr) which do not represent real colours. For example, there is only one colour in the black plane, which is zero saturation black. All other saturation values are meaningless but are possible within the normal representation of these colour spaces. Module 3 permits the range of values in the LUT to be optimised to avoid retention of values that are not to be used in the particular colour conversion operation.

Implementation

Figure 4:
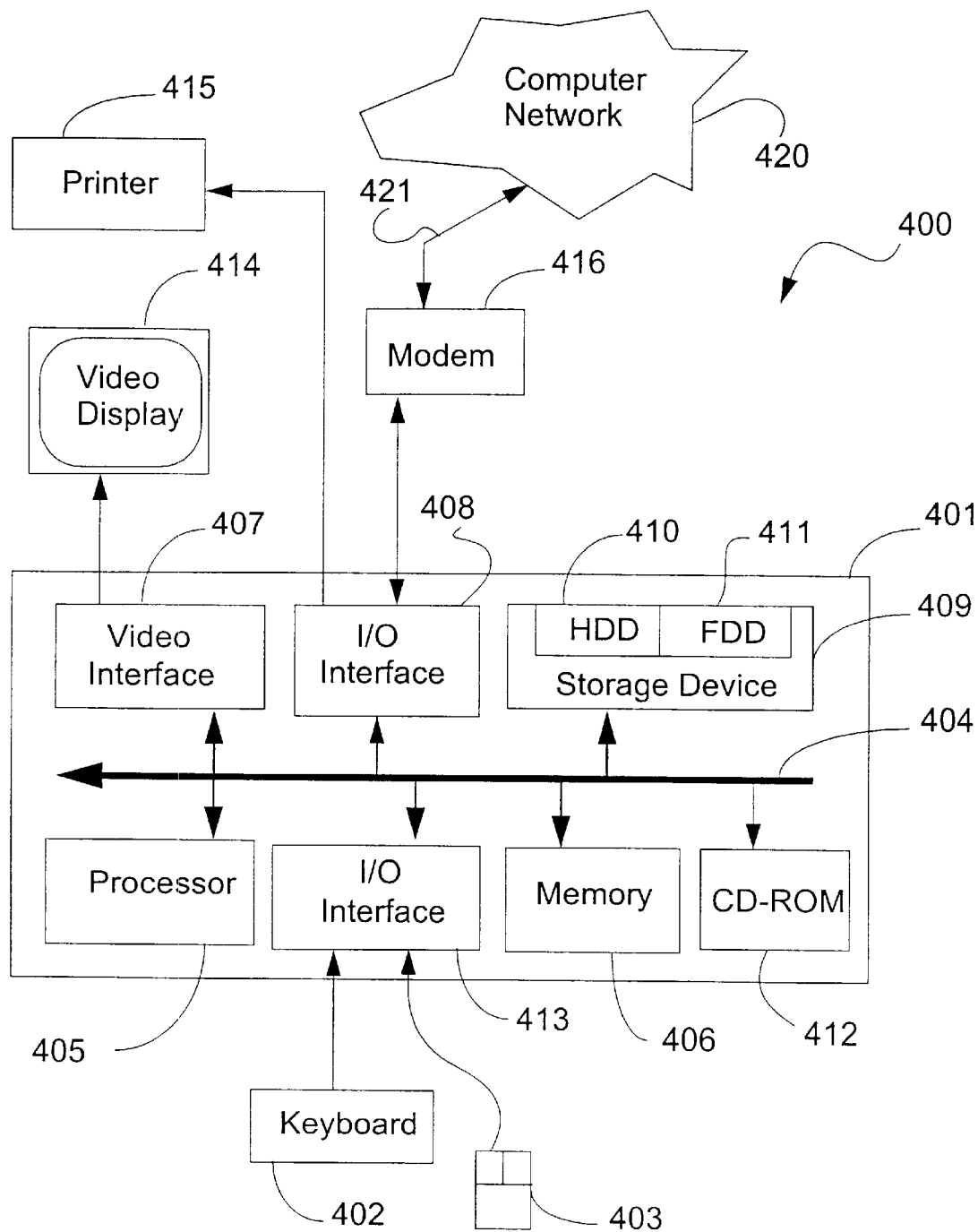
FIG. 4 is a schematic block diagram of a general purpose computer upon which the preferred embodiment of the present invention can be practiced.

The methods of colour conversion described above are preferably practised using a conventional general-purpose computer system 400, such as that shown in FIG. 4 wherein the processes of the described Modules and FIGS. 1 to 3 may be implemented as software, such as an application program, executing within the computer system 400. The application program may be a stand-alone colour converter, or alternately incorporated as part of an image manipulation or desk top publishing package, or the like. In particular, the methods include steps that are effected by instructions in the software that are carried out by the computer. The software may be divided into two separate parts; one part for carrying out the methods of the Modules and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for colour conversion in accordance with the embodiments of the invention.

The computer system 400 comprises a computer module 401, input devices such as a keyboard 402 and mouse 403, output devices including a printer 415 and a display device 414. A Modulator-Demodulator (Modem) transceiver device 416 is used by the computer module 401 for communicating to and from a communications network 420, for example connectable via a telephone line 421 or other functional medium. The modem 416 can be used to obtain access to the Internet, and other network systems, such as a Local Area Network (LAN) or a Wide Area Network (WAN).

The computer module 401 typically includes at least one processor unit 405, a memory unit 406, for example formed from semiconductor random access memory (RAM) and read only memory (ROM), input/output (I/O) interfaces including a video interface 407, and an I/O interface 413 for the keyboard 402 and mouse 403 and optionally a joystick (not illustrated), and an interface 408 for the modem 416. A storage device 409 is provided and typically includes a hard disk drive 410 and a floppy disk drive 411. A magnetic tape drive (not illustrated) may also be used. A CD-ROM drive 412 is typically provided as a non-volatile source of data. The components 405 to 413 of the computer module 401, typically communicate via an interconnected bus 404 and in a manner which results in a conventional mode of operation of the computer system 400 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 410 and read and controlled in its execution by the processor 405. Intermediate storage of the program and any data fetched from the network 420 may be accomplished using the semiconductor memory 406, possibly in concert with the hard disk drive 410. In some instances, the application program may be supplied to the user encoded on a CD-ROM or floppy disk and read via the corresponding drive 412 or 411, or alternatively may be read by the user from the network 420 via the modem device 416. Still further, the software can also be loaded into the computer system 400 from other computer readable medium including magnetic tape, a ROM or integrated circuit, a magneto-optical disk, a radio or infra-red transmission channel between the computer module 401 and another device, a computer readable card such as a PCMCIA card, and the Internet and Intranets including e-mail transmissions and information recorded on websites and the like. The foregoing is merely exemplary of relevant computer readable mediums. Other computer readable mediums may be practiced without departing from the scope and spirit of the invention.

The method of colour conversion may alternatively be implemented either in part or whole in dedicated hardware such as one or more integrated circuits performing the functions or sub-functions of the Modules. Such dedicated hardware may include arithmetic processors, or one or more microprocessors and associated memories.

It will be apparent form the forgoing that the described embodiments allow for the optimising colour data conversions between any two arbitrary colour spaces without the computational overhead of converting via a standard colour space and without the development overhead of separately coding each conversion. They also permit separating the definition of the colour space conversions from the computing platform on which they are to run thereby allowing optimisations to be performed at run-time depending on the available hardware. Further, the embodiments conveniently permit controlling a compromise between speed and accuracy of colour conversions on any given platform.

Industrial Applicability

The embodiment(s) of the invention are applicable to the computer and image processing industries where various colour formats are routinely utilised, often without any direct invocation by the user.

The foregoing describes only some embodiments of the present invention, and modifications and/or changes can be made thereto without departing from the scope and spirit of the present invention, the described embodiments being illustrative and not restrictive.

What is claimed is:

1. A method of optimising conversions between colour spaces, said method comprising the steps of:
    (i) identifying a set of mathematical functions which, when performed in sequence, implement said conversions between colour spaces;
    (ii) identifying a set of computational operations for evaluation using a computing device, said operations, when performed in (first) sequence cause said colour conversions;
    (iii) identifying at least one particular sequence of said mathematical functions which when performed converts colours between a first colour space and a second colour space;
    (iv) transforming said particular sequence into a (second) sequence of computational operations chosen from said set of computational operations having substantially the same transformation effect as said particular sequence.

2. A method according to claim 1 wherein steps (iii) and (iv) are performed at a time at which a colour conversion is requested (run-time).

3. A method according to claim 2 wherein said computational operations each have a corresponding (first) computational accuracy and an output of each said mathematical function has a corresponding (second) computational accuracy, and when said corresponding second computational accuracy is better than said corresponding first computational accuracy, said method comprises the further step of modifying said second sequence of operations to minimise an effect of the limited accuracy of the computational operation.

4. A method according to claim 3 wherein said modifying comprises combining a plurality of said computational operations into a single said computational operation.

5. A method according to claim 3 wherein said modifying utilises a state table related to said mathematical functions and a set of states each representing a particular relationship between the corresponding first and second computational accuracies.

6. A method according to claim 2 wherein said set of operations comprises functions selected from the group consisting of:
    a matrix multiplication;
    a one-dimensional look-up table; and
    a multi-dimensional look-up table.

7. A method according to claim 2 wherein said set of mathematical functions comprises functions selected from the group consisting of:
    a single variate function;
    a single variate function expressed as a look-up table;
    a multi-variate function;
    a multi-variate function expressed as a look-up table; and
    a matrix multiplication.

8. A method according to claim 2 wherein at least part of step (ii) is performed at said time.

9. A method according to claim 1 wherein said second colour space is said first colour space.

10. A method of optimising a conversion between a first colour space and a second colour space, said conversion traversing a chain of colour spaces including said first and second colour spaces and at least one intermediate colour space between said first and second colour spaces, said method comprising the steps of:
    (i) identifying a first set of mathematical functions each defining a conversion between adjacent colour spaces within said chain;
    (ii) reducing said first set of mathematical functions to define a second set of computational functions, for converting between said first and second colour spaces; and
    (iii) performing a conversion from said first colour space to said second colour space using said second set of functions.

11. A method according to claim 10 wherein step (ii) is performed at a time at which a colour conversion is requested (run-time).

12. A method according claim 11 wherein said first set of mathematical functions is unbounded by computational accuracy, said method comprising the further step of establishing a level of computational accuracy for each conversion of step (i) between adjacent colour spaces in said chain, wherein said second set of computational functions are bounded by a corresponding established level of computational accuracy.

13. A method according to claim 12 wherein said second set of functions comprises functions selected from the group consisting of:
    a matrix multiplication;

a one-dimensional look-up table; and a multi-variate look-up table.

14. A method according to claim 1 wherein step (iii) comprises sequentially combining at least two sequences of said mathematical functions to form a single sequence which has the same effect of said at least two when executed.

15. A method according to claim 14, wherein said sequentially combining comprises the sub-steps of:

(ii-a) comparing a last function of a first said sequence and a first function of a second said sequence;

(ii-b) removing both said functions from said sequences if said functions are the mathematical inverse of one another;

(ii-c) repeating steps (ii-a) and (ii-b) until the two said functions are not the mathematical inverse of one another; and (ii-d) combining the two sequences at a current last function of the first sequence and at a current first function of the second sequence.

16. A method according to claim 1 wherein step (iv) comprises determining a processing gamut for intermediate colour spaces traversed in a colour conversion chain from said first colour space to said second colour space, said determining comprising the substeps of:

(iv-a) forward processing said chain to determine, based from a gamut of said first colour space, an input bounding box of values for each remaining colour space in said chain;

(iv-b) reverse processing said chain to determine, based from a gamut of said second output colour space, an output bounding box for each preceding colour space in said chain;

(iv-c) for each colour space in said chain, determining an intersection between the corresponding input and output bounding boxes to establish a processing gamut for said colour space in said conversion.

17. A method according to claim 16 of wherein steps (iv-a), (iv-b) and (iv-c) comprise:

forming a first list of critical colours in said first colour space;

for each intermediate colour space in said chain, forming a corresponding first list of said critical colours in said intermediate colour space;

for each said intermediate colour space in said chain, forming a corresponding first bounding box enclosing the corresponding first list of critical colours;

forming a second list of critical colours for said second colour space; for each said intermediate colour space in said chain, transforming said second list of critical colours into a corresponding second list of critical colours for said corresponding intermediate colour space;

for each said intermediate colour space, forming a second bounding box enclosing the corresponding said second list of critical colours; and for each said intermediate colour space in said chain, reducing said corresponding first bounding box to form an intersection with said corresponding second bounding box, said intersection defining said processing gamut for the corresponding intermediate colour space.

18. A computer readable medium, having a program recorded thereon, where the program is configured to make a computer execute a procedure for optimising conversions between colour spaces, said program comprising:

(i) code for identifying a set of mathematical functions which, when performed in sequence, implement said conversions between colour spaces;

(ii) code for identifying a set of computational operations for evaluation using a computing device, said operations, when performed in (first) sequence cause said colour conversions;

(iii) code for identifying at least one particular sequence of said mathematical functions which when performed converts colours between a first colour space and a second colour space;

(iv) code for transforming said particular sequence into a (second) sequence of computational operations chosen from said set of computational operations having substantially the same transformation effect as said particular sequence.

19. A computer readable medium according to claim 18 wherein said computational operations each have a corresponding (first) computational accuracy and an output of each said mathematical function has a corresponding (second) computational accuracy, and when said corresponding second computational accuracy is better than said corresponding first computational accuracy, said method comprises the further step of modifying said second sequence of operations to minimise an effect of the limited accuracy of the computational operation.

20. A computer readable medium according to claim 19 wherein said modifying comprises combining a plurality of said computational operations into a single said computational operation.

21. A computer readable medium according to claim 19 wherein said modifying utilises a state table related to said mathematical functions and a set of states each representing a particular relationship between the corresponding first and second computational accuracies.

22. A computer readable medium according to claim 18 wherein said set of operations comprises functions selected from the group consisting of:

a matrix multiplication;

a one-dimensional look-up table; and a multi-dimensional look-up table.

23. A computer readable medium according to claim 18 wherein said set of mathematical functions comprises functions selected from the group consisting of: a single variate function; a single variate function expressed as a look-up table; a multi-variate function; a multi-variate function expressed as a look-up table; and a matrix multiplication.

24. A computer readable medium according to claim 18 wherein code (iii) and (iv) are performed at a time at which a colour conversion is requested (run-time).

25. A computer readable medium according to claim 24 wherein at least part of code (ii) is performed at said time.

26. A computer readable medium according to claim 18 wherein said second colour space is said first colour space.

27. A computer readable medium, having a program recorded thereon, where the program is configured to make a computer execute a procedure for optimising a conversion between a first colour space and a second colour space, said conversion traversing a chain of colour spaces including said first and second colour spaces and at least one intermediate colour space between said first and second colour spaces, said program comprising:

(i) code for identifying a first set of mathematical functions each defining a conversion between adjacent colour spaces within said chain;

(ii) code for reducing said first set of mathematical functions to define a second set of computational functions, for converting between said first and second colour spaces; and (iii) code for performing a conversion from said first colour space to said second colour space using said second set of functions.

28. A computer readable medium according claim 27 wherein said first set of mathematical function are unbounded by computational accuracy, said method comprising the further step of establishing a level of computational accuracy for each conversion of code (i) between adjacent colour spaces in said chain, wherein said second set of computational functions are bounded by a corresponding established level of computational accuracy.

29. A computer readable medium according to claim 28 wherein said second set of functions comprises functions selected from the group consisting of:
- a matrix multiplication;
- a one-dimensional look-up table; and
- a multi-variate look-up table.

30. A computer readable medium according to claim 18 wherein code (iii) comprises code for sequentially combining at least two sequences of said mathematical functions to form a single sequence which has the same effect of said at least two when executed.

31. A computer readable medium according to claim 30, wherein said sequentially combining comprises code for:
(ii-a) comparing a last function of a first said sequence and a first function of a second said sequence;
(ii-b) removing both said functions from said sequences if said functions are the mathematical inverse of one another;
(ii-c) repeating steps (ii-a) and (ii-b) until the two said functions are not the mathematical inverse of one another; and
(ii-d) combining the two sequences at a current last function of the first sequence and at a current first function of the second sequence.

32. A computer readable medium according to claim 18 wherein said code (iv) comprises further code for determining a processing gamut for intermediate colour spaces traversed in a colour conversion chain from said first colour space to said second colour space, said further code comprising code for:
(iv-a) forward processing said chain to determine, based from a gamut of said first colour space, an input bounding box of values for each remaining colour space in said chain;
(iv-b) reverse processing said chain to determine, based from a gamut of said second output colour space, an output bounding box for each preceding colour space in said chain;
(iv-c) for each colour space in said chain, determining an intersection between the corresponding input and output bounding boxes to establish a processing gamut for said colour space in said conversion.

33. A computer readable medium according to claim 32 of wherein further code (iv-a), (iv-b) and (iv-c) comprise code for:
forming a first list of critical colours in said first colour space;
for each intermediate colour space in said chain, forming a corresponding first list of said critical colours in said intermediate colour space;
for each said intermediate colour space in said chain, forming a corresponding first bounding box enclosing the corresponding first list of critical colours;
forming a second list of critical colours for said second colour space;
for each said intermediate colour space in said chain, transforming said second list of critical colours into a corresponding second list of critical colours for said corresponding intermediate colour space;
for each said intermediate colour space, forming a second bounding box enclosing the corresponding said second list of critical colours; and
for each said intermediate colour space in said chain, reducing said corresponding first bounding box to form an intersection with said corresponding second bounding box, said intersection defining said processing gamut for the corresponding intermediate colour space.

34. Apparatus for optimising conversions between colour spaces, said apparatus comprising: first means for identifying a set of mathematical functions which, when performed in sequence, implement said conversions; second means for identifying (first) sequences of said mathematical functions which when preformed convert colours between said colour spaces; third means for identifying a set of computational operations for evaluation using a computing device, said operations, when performed in (second) sequences cause said colour conversions; fourth means for identifying a particular one of said first sequences required for converting from a first colour space to a second colour space; and fifth means for transforming said particular sequence into a (third) sequence of computational operations chosen from said set of computational operations having substantially the same transformation effect as said particular sequence.

35. Apparatus according to claim 34 wherein said computational operations each have a corresponding (first) computational accuracy and an output of each said mathematical function has a corresponding (second) computational accuracy, and when said corresponding second computational accuracy is better than said corresponding first computational accuracy, said method comprises the further step of modifying said second sequence of operations to minimise an effect of the limited accuracy of the computational operation.

36. Apparatus according to claim 35 wherein said modifying comprises combining a plurality of said computational operations into a single said computational operation.

37. Apparatus according to claim 35 wherein said modifying utilises a state table related to said mathematical functions and a set of states each representing a particular relationship between the corresponding first and second computational accuracies.

38. Apparatus according to claim 34 wherein said second set of operations comprises functions selected from the group consisting of:
- a matrix multiplication;
- a one-dimensional look-up table; and
- a multi-variate look-up table.

39. Apparatus according to claim 34 wherein said set of mathematical functions comprises functions selected from the group consisting of:
- a single variate function;
- a single variate function expressed as a look-up table;
- a multi-variate function;
- a multi-variate function expressed as a look-up table; and
- a matrix multiplication.

40. A method of sequentially combining two sequences of colour conversion functions to form a single sequence for conversion between colour spaces, the single sequence having the same effect of said two sequences when executed, said method comprising the steps of:

(a) comparing a last function of a first said sequence and a first function of a second said sequence;

(b) removing both said functions from said sequences if said functions are an inverse of one another;

(c) repeating steps (a) and (b) until the two said functions are not the inverse of one another; and (d) combining the two sequences at a current last function of the first sequence and at a current first function of the second sequence to obtain the single sequence of colour conversions functions.

41. A method according to claim 40 wherein said two sequences of functions are drawn from a set of such sequences which define colour conversions from a base colour space to and from a set of required colour spaces.

42. A method according to claim 41 wherein said base colour space is the CIE XYZ colour space.

43. A method according to claim 40 wherein one of said colour spaces in at least two of said input sequencies comprises the XYZ colour space.

44. A method of combining a sequential plurality of colour conversion lists to form a single composite colour conversion list having a corresponding conversion function, each said conversion list traversing a chain of colour spaces comprising at least a corresponding source colour space and a corresponding terminal colour space, said method comprising the steps of:

(i) identifying from said input lists an adjacent sequential pair of lists and designating the same as a first input list and a second input list respectively;

(ii) performing the method of claim 40 on said designated first and second input lists to form a corresponding output list;

(iii) substituting said output list into said sequence of said input lists in place of said first and second lists; and (iv) repeating steps (i) to (iii) until a single list remains and designating said single list as said composite list.

45. A method according to claim 44 wherein one of said colour spaces in at least two of said input lists comprises the XYZ colour space.

46. A computer readable medium, having a program recorded thereon, where the program is configured to make a computer execute a procedure for sequentially combining a first colour conversion list with a second colour conversion list to form a single output conversion list having a corresponding conversion function, each said conversion list traversing a chain of colour spaces comprising at least a corresponding source colour space and a corresponding terminal colour space, said program comprising:

(a) code for comparing said terminal colour space of said first list with said source colour space of said second list;

(b) code for terminating said combining where said terminal colour space of said first list does not correspond to said source colour space of said second list;

(c) code for, where said terminal colour space of said first list corresponds to said source colour space of said second list:

(ca) marking one of the compared said terminal or source colour spaces as an intermediate colour space and assigning in each said list a next adjacent colour space as the corresponding terminal colour space and source colour space respectively;

(cb) comparing said assigned terminal colour space of said first list with said assigned source colour space of said second list;

(cc) where said assigned colour spaces correspond, invoking a repeat of code (ca) on said assigned terminal and source colour spaces; and (cd) where said assigned colour spaces do not correspond, joining said lists between a current said intermediate colour space and said assigned colour space of the other said list.

47. A computer readable medium, having a program recorded thereon, where the program is configured to make a computer execute a procedure for combining a sequential plurality of colour conversion lists to form a single composite colour conversion list having a corresponding conversion function, each said conversion list traversing a chain of colour spaces comprising at least a corresponding source colour space and a corresponding terminal colour space, said program comprising:

(i) code for identifying from said input lists an adjacent sequential pair of lists and designating the same as a first input list and a second input list respectively;

(ii) code for performing the method of claim 40 on said designated first and second input lists to form a corresponding output list;

(iii) code for substituting said output list into said sequence of said input lists in place of said first and second lists; and (iv) code for repeatedly calling code (i) to (iii) until a single list remains and designating said single list as said composite list.

48. A computer readable medium according to claim 47 wherein one of said colour spaces in at least two of said input lists comprises the XYZ colour space.

49. A computer readable medium, having a program recorded thereon, where the program is configured to make a computer execute a procedure for sequentially combining two sequences of colour conversion functions to form a single sequence for conversion between colour spaces, the single sequence having the same effect of said two sequences when executed, said program comprising code for the steps of:

(a) comparing a last function of a first said sequence and a first function of a second said sequence;

(b) removing both said functions from said sequences if said functions are an inverse of one another;

(c) repeating steps (a) and (b) until the two said functions are not an inverse of one another; and (d) combining the two sequences at a current last function of the first sequence and at a current first function of the second sequence to obtain the single sequence of colour conversion functions.

50. A computer readable medium according to claim 49 wherein said two sequences of functions are drawn from a set of such sequences which define colour conversions from a base colour space to and from a set of required colour spaces.

51. A computer readable medium according to claim 50 wherein said base colour space is the CIE XYZ colour space.

52. Apparatus for sequentially combining a first colour conversion list with a second colour conversion list to form a single output conversion list having a corresponding conversion function, each said conversion list traversing a chain of colour spaces comprising at least a corresponding source colour space and a corresponding terminal colour space, said apparatus comprising the steps of:

means for comparing said terminal colour space of said first list with said source colour space of said second list;

means for determining where said terminal colour space of said first list does not correspond to said source colour space of said second list, and if so, terminating said combining; and where said terminal colour space of said first list corresponds to said source colour space of said second list, means for:
- (ca) marking one of the compared said terminal or source colour spaces as an intermediate colour space and assigning in each said list a next adjacent colour space as the corresponding terminal colour space and source colour space respectively;
- (cb) comparing said assigned terminal colour space of said first list with said assigned source colour space, of said second list;
- (cc) where said assigned colour spaces correspond, repeating (ca) on said assigned terminal and source colour spaces; and
- (cd) where said assigned colour spaces do not correspond, joining said lists between a current said intermediate colour space and said assigned colour space of the other said list.

53. Apparatus for combining a sequential plurality of colour conversion lists to form a single composite colour conversion list having a corresponding conversion function, each said conversion list traversing a chain of colour spaces comprising at least a corresponding source colour space and a corresponding terminal colour space, said apparatus comprising the steps of first means for identifying from said input lists an adjacent sequential pair of lists and designating the same as a first input list and a second input list respectively; second means for performing the method of claim 40 on said designated first and second input lists to form a corresponding output list; third means for substituting said output list into said sequence of said input lists in place of said first and second lists; and fourth means for repeatedly invoking said first second and third means until a single list remains and designating said single list as said composite list.

54. Apparatus according to claim 53 wherein one of said colour spaces in at least two of said input lists comprises the XYZ colour space.

* * * * *

UNITED STATES PATENT AND TRADEMARK OFFICE
CERTIFICATE OF CORRECTION

PATENT NO.    : 6,758,574 B1
DATED         : July 6, 2004
INVENTOR(S)   : Peter Malcolm Roberts It is certified that error appears in the above-identified patent and that said Letters Patent is hereby corrected as shown below:

<u>Title page,</u>
Item [57], ABSTRACT,
Line 1, "Disclose" should read -- Disclosed --; and
Line 6, "preformed" should read -- performed --.

<u>Column 11,</u>
Line 15, "$G_1^{\ 1} \to M_1$" should read -- $G_1^{-1} \to M_1^{-1}$ --;
Line 21, "$G_1^{\ 1} G_2 \to G_2^{\ 1} \to M_1^{\ 1} \to M_2 \to G_2$" should read
-- $G_1^{-1} \to G_2 \to G_2^{-1} \to M_1^{-1} \to M_2 \to G_2$ --; and
Line 25, equation (8) should read:

$$-- \begin{bmatrix} G_1^{-1} \to G_2 \\ \text{1D-LUT} \end{bmatrix} \quad \to \quad \begin{bmatrix} G_2^{-1} \to M_1^{-1} \to M_2 \to G_2 \\ \text{3D-LUT} \end{bmatrix} --$$

<u>Column 17,</u>
Line 67, "have" should read -- has --.

<u>Column 19,</u>
Line 36, "of" should be deleted.

<u>Column 21,</u>
Line 5, "function" should read -- functions --.
Line 24, "sequentially" should read -- code for sequentially --; and
Line 54, "of" should be deleted.

<u>Column 22,</u>
Line 18, "preformed" should read -- performed --.

<u>Column 23,</u>
Line 18, "sequencies" should read -- sequences --.

UNITED STATES PATENT AND TRADEMARK OFFICE
CERTIFICATE OF CORRECTION

PATENT NO. : 6,758,574 B1
DATED : July 6, 2004
INVENTOR(S) : Peter Malcolm Roberts It is certified that error appears in the above-identified patent and that said Letters Patent is hereby corrected as shown below:

Column 26,
Line 7, "o£" should read -- of --.

Signed and Sealed this

Eleventh Day of October, 2005

JON W. DUDAS
*Director of the United States Patent and Trademark Office*